Figure 1A:
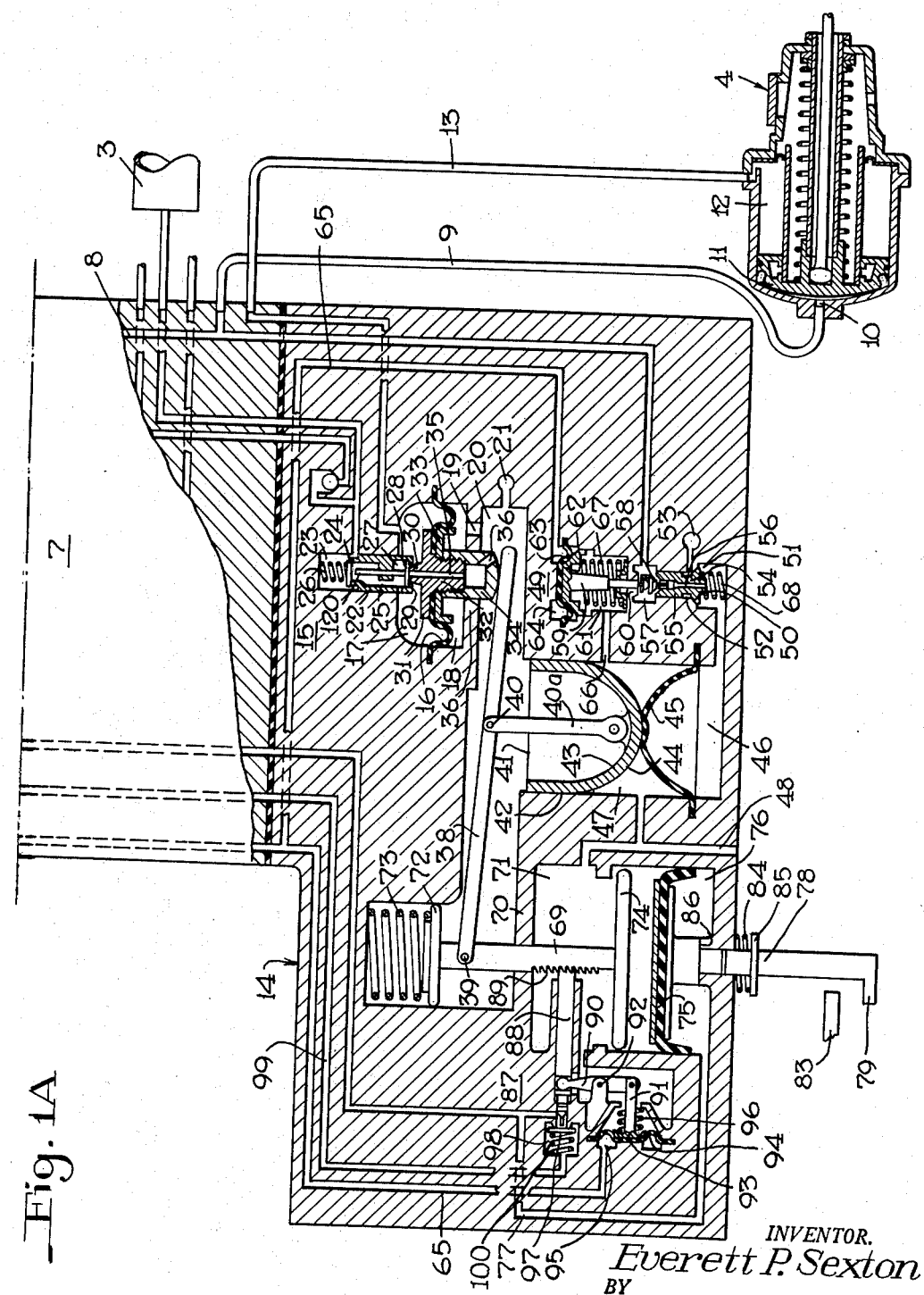

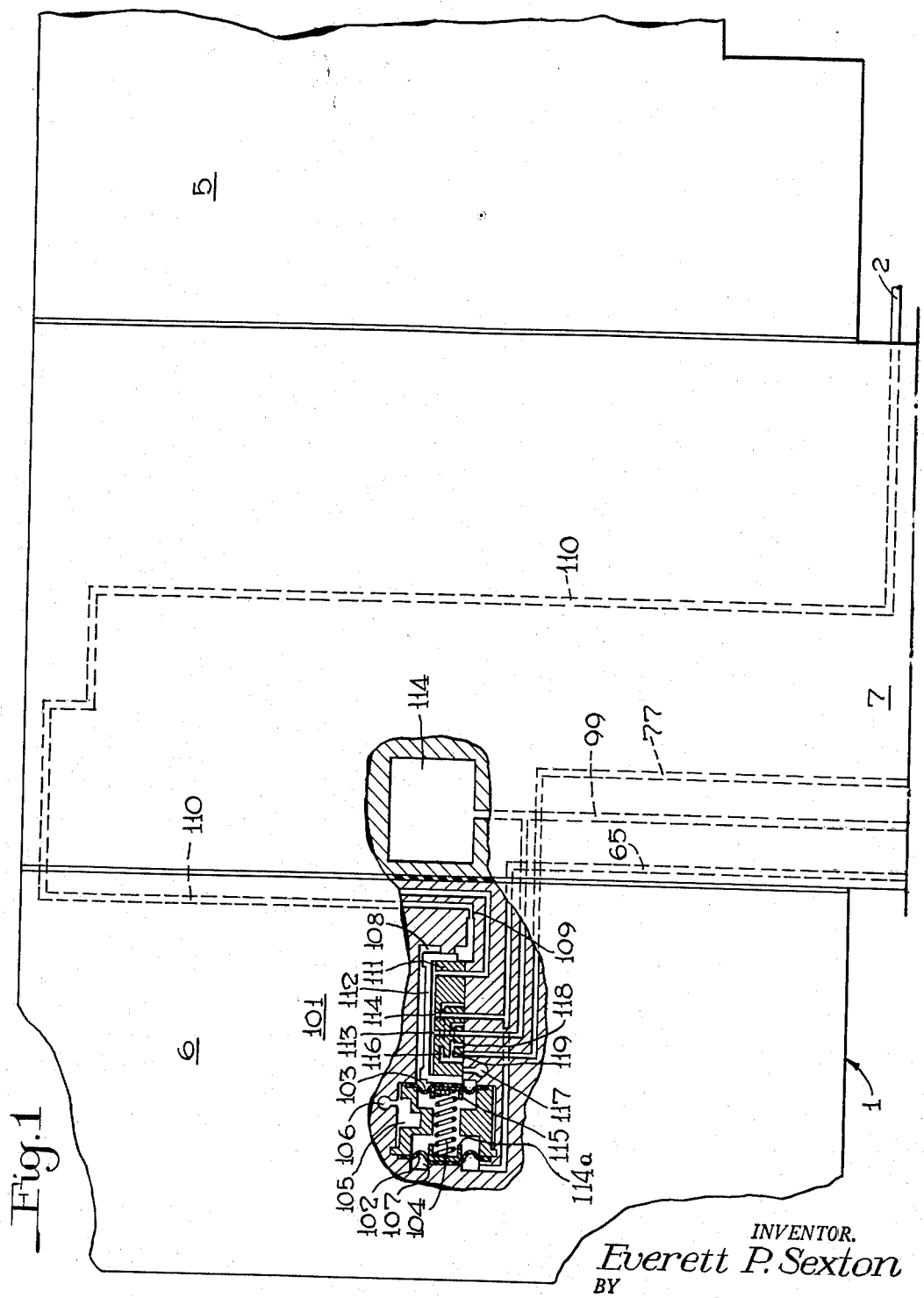

Aug. 9, 1955          E. P. SEXTON          2,715,050

LOAD COMPENSATING FLUID PRESSURE BRAKE EQUIPMENT

Filed Aug. 9, 1951          2 Sheets-Sheet 2

INVENTOR.
Everett P. Sexton
BY Frank E. Miller
ATTORNEY

United States Patent Office 2,715,050
Patented Aug. 9, 1955

2,715,050

LOAD COMPENSATING FLUID PRESSURE BRAKE EQUIPMENT

Everett P. Sexton, East McKeesport, Pa., assignor to Westinghouse Air Brake Company, Wilmerding, Pa., a corporation of Pennsylvania Application August 9, 1951, Serial No. 241,139

11 Claims. (Cl. 303—22)

This invention relates to fluid pressure brake apparatus and more particularly to the type which varies the degree of braking of a vehicle according to the load carried by the vehicle.

In the pending application of Earle S. Cook, Serial No. 238,918, filed July 27, 1951, and assigned to the assignee of the present application, there is disclosed a brake apparatus of the above type which embodies a fluid pressure controlled flexible diaphragm carried by an element both of which are adjustably axially relative to a parabolic face of a follower engaged by the diaphragm, according to the load on a vehicle. The area of the diaphragm engaging the parabolic face of the follower will therefore be likewise adjusted so that for any chosen pressure of fluid acting on the diaphragm in a chamber formed between the diaphragm and carrying element, the force exerted by the diaphragm against the follower will be likewise varied to thereby correspondingly vary the degree of braking of the vehicle. A slip joint connection provides for supply and release of fluid under pressure to and from the chamber between the diaphragm and carrying element. This connection is difficult to maintain leak tight and the principal object of the invention is therefore the provision of an improved brake apparatus which is free of such a connection.

Other objects and advantages of the invention will become apparent from the following more detailed description thereof.

In the accompanying drawings: Figs. 1, 1A, when the bottom edge of Fig. 1 is matched to the top edge of Fig. 1A, is a diagrammatic view of a brake apparatus embodying the invention.

Description

As shown in the drawing, the reference numeral 1 designates a brake controlling valve device embodying the invention, 2 designates the usual brake pipe, 3 designates a load reservoir normally charged with fluid under pressure like brake pipe 2, and 4 designates a brake cylinder device.

The brake controlling valve device 1 is generally like that disclosed in the above mentioned application in view of which only such parts are shown as deemed necessary to a clear understanding of the invention. For like reasons, the following description will also be limited.

Briefly, the brake controlling valve device 1 comprises a service application portion 5 and an emergency application portion 6 mounted on opposite faces of a pipe bracket 7. The service application portion 5 is adapted to operate upon a service rate of reduction in pressure in brake pipe 2 to supply fluid under pressure to a passage 8 and thence via pipe 9 to the usual pressure chamber 10 in the brake cylinder device 4 for actuating the usual piston 11 in said device to apply brakes on a vehicle. Upon an emergency rate of reduction in pressure in brake pipe 2, the emergency application portion 6 is adapted to operate along with the service application portion 5 to supply fluid under pressure to passage 8 and thence to the brake cylinder chamber 10 to apply brakes on the vehicle. Upon restoring pressure of fluid in brake pipe 2 after either a service or an emergency application of brakes, fluid under pressure is adapted to be released from the brake cylinder pressure chamber 10 via reverse flow through pipe 9 and passage 8 to effect a release of vehicle brakes.

At the side of the brake cylinder piston 11 opposite chamber 10 is a compensating pressure chamber 12 connected by a pipe 13 to a load compensating valve device 14 carried by a third face of the pipe bracket 7 and embodying the invention.

The load compensating valve device 14 comprises a fluid pressure supply and release valve device 15 for controlling pressure of fluid in pipe 13, said device comprising a flexible diaphragm 16 at one side of which is a pressure control chamber 17 open to said pipe while at the opposite side is a chamber 18 which is open to atmosphere via passage 19, a chamber 20 and a passage 21. Secured in the casing of the device and projecting at one end into chamber 17 is a bushing 22 at the opposite end of which is a chamber 23 adapted to be constantly supplied with fluid under pressure from the load reservoir 3. A supply valve 24 in chamber 23 is arranged to cooperate with a seat provided on the adjacent end of bushing 22 for closing communication between said chamber and a passage 25 extending through said bushing and opening to chamber 17. A spring 26 in chamber 23 acts on valve 24 for urging it to its seat. In the lower end of bushing 22 is a chamber 27 containing a release valve 28 adapted to be supported by an inwardly extending annular ledge 29 formed at the lower end of said bushing around an opening through which a movable seat 30 for said valve extends. The seat 30 is provided on the end of an extension of a follower plate 31 contained in chamber 17 and engaging one side of the diaphragm. The plate 31 has an oppositely projecting stud 32 extending through the diaphragm and a follower plate 33 engaging the opposite side of said diaphragm in chamber 18 in which chamber a nut 34 is screwed on to said stud against the plate 33 to firmly clamp the central portion of said diaphragm between the two plates 31, 33. The release valve seat 30 encircles a passage 35 which is open through a passage 36 in nut 34 to chamber 20 and thence atmosphere via passage 21. A pin 120 slidably mounted in bushing 22 rests at one end on the release valve 28 while its opposite end is disposed for contact with the supply valve 24 to unseat same.

The nut 34 is slidably mounted in a bore through a partition wall 36 separating chambers 18 and 20 and extends into the latter chamber where it engages a lever 38 adjacent one end. The opposite end of lever 38 is connected to an adjustable fulcrum pin 39 while intermediate its ends said lever is pivotally connected through the medium of a pin 40 and rod 40a to a diaphragm follower 41. The follower 41 has a cylindrical portion 42 in slidable contact with the wall of a casing bore and a closed end portion 43 the outer surface 44 of which is parabolic in contour. This parabolic surface 44 engages the closed end of an inverted cup shaped diaphragm 45 which is clamped around its edge in the casing to provide a pressure chamber 46 within the diaphragm. Between the diaphragm 45 and the follower 41 is a chamber 47 which is vented via a passage 48 open to atmosphere, while the opposite side of follower 41 is also open to atmosphere via chamber 20 and passage 21.

The numeral 49 designates an unloading valve device which comprises a valve 50 contained in a chamber 51 which is open to chamber 46. The valve 50 is arranged to control communication between chamber 51 and a chamber 52 which is open to atmosphere via passage 53 and is provided on one end of a stem 54 projecting through chamber 52 and connected at its opposite end to a plunger 55 which is slidably mounted in the casing. The plunger 55 and stem 54 have an axial passage 56 open at one end to chamber 51 and at the opposite end open through a valve seat on plunger 55 to a chamber 57 containing a valve 58 arranged to cooperate with said seat to close communication between chamber 57 and passage 56. Chamber 57 is open to the brake cylinder passage 8.

The valve 58 is connected to one end of a stem 59 extending from chamber 57 through a partition wall 60 into a chamber 61 wherein it is provided with a follower head 62 engaging one side of a flexible diaphragm 63 at the opposite side of which is a control chamber 64 which is open to a passage 65. Chamber 61 is open to atmosphere via passage 66, chamber 47 and passage 48 and contains a spring 67 acting through the follower head 62 on diaphragm 63 with a chosen force, while a spring 68 in chamber 51 acts on valve 50 urging it to its seat.

The adjustable fulcrum pin 39 carrying the one end of lever 38 is carried by a rod 69 extending from chamber 20 through a partition wall 70 in the casing into a chamber 71. The end of rod 69 in chamber 20 terminates in a follower 72 subject to pressure of a spring 73 constantly urging said rod in the direction of chamber 71. The end of rod 69 in chamber 71 terminates in a head 74 provided for engagement by one side of an adjusting strut piston 75 at the opposite side of which is a pressure chamber 76 open to a casing passage 77. The piston 75 has a stem 78 projecting through chamber 76 and a casing bore to the exterior of the casing where its end terminates in a foot 79.

The brake controlling valve device is adapted to be carried by the body or other sprung portion of the vehicle, but the foot 79 on the end of piston stem 78 is adapted to be moved by fluid under pressure in chamber 76 into engagement with an unsprung portion 83 of the vehicle. A spring 84 encircling the piston stem 78 acts on a collar 85 secured to said stem for, with chamber 76 void of fluid under pressure, moving piston 75 to the position in which it is shown in the drawing defined by contact of a shoulder 86 on said stem with the casing. With the piston 75 thus positioned, the foot 79 will be moved away from the unsprung portion 83 of the vehicle.

Numeral 87 designates a device for locking the rod 69 against movement, said device comprising a rod 88 slidably mounted in a casing bore at right angles to and in line with one side of rod 69. The rod 69 is provided along the one side with a series of teeth 89 with which, teeth on the adjacent end of rod 88 are adapted to mesh to hold rod 69 against movement. One end of a lever 90 is connected to rod 88, its opposite end is pivotally connected to one end of a stem 91 while intermediate its ends said lever is fulcrumed on a casing carried pin 92. The other end of stem 91 is in the form of a follower 93 engaging one side of a flexible diaphragm 94. At the opposite side of diaphragm 94 is a pressure chamber 95 open to passage 65. A spring 96 acts on the stem follower 93 for urging lever 91 in a direction to move rod 88 into locking engagement with stem 69.

The rod 88 is provided on the end opposite rod 69 with a projection slidably mounted in a bore in the casing and with its end disposed for engaging and unseating a valve 97 subsequent to movement of said rod out of locking engagement with rod 69. The check valve 97 is contained in a chamber 98 to which a passage 99 is connected and controls communication between said passage and passage 77. A spring 100 acts on check valve 97 urging it to a position for closing communication from passage 99 to passage 77.

Numeral 101 designates a cut-off valve device constituting a part of the emergency application portion 6 and which is the same as a corresponding device disclosed in the aforementioned pending application. Briefly, the cut-off valve device 101 comprises two spaced apart coaxially arranged flexible diaphragms 102, 103 connected to each other by a spring 104 which is contained in a chamber 105 formed between the diaphragms and open to atmosphere via passage 106. The diaphragm 102 is larger than diaphragm 103 and the opposite or outer faces of said diaphragms are subject to pressure of fluid in chambers 107, 108, respectively. Chamber 108 is constantly open through a choke 109 and a passage 110 to brake pipe 2 and contains a slide valve 111 connected by a stem 112 to diaphragm 103 for movement therewith. Passages 65, 99 and 77 all lead to the seat of slide valve 111, passage 65 being also connected to diaphragm chamber 107.

*Operation*

When the pressure of fluid in brake pipe 2 is below a chosen pressure, such as ten pounds, spring 104 in the cut-off valve device 101 will move the diaphragms 102, 103 to the position in which they are shown in the drawing, the slide valve 111 also assuming the position in which it is shown in the drawing. With the cut-off slide valve 111 thus positioned, passages 65 and 99 will be opened through ports 114, 113, respectively, in said slide valve to valve chamber 108 and brake pipe 2 while passage 77 will be lapped by said valve.

With passage 65 thus open to brake pipe 2 which is vented, diaphragm chamber 95 in the locking device 87 will be vented and spring 96 will be holding rod 88 in locking engagement with rod 69 and diaphragm chamber 64 in the unloading valve device 49 will also be vented permitting unseating of valve 58 by spring 67 and seating of valve 50 by spring 68 whereby the compensating diaphragm chamber 46 will be open to passage 8. Assuming that the brakes on the vehicle are released by venting of the brake cylinder pressure chamber 10 through passage 8, diaphragm chamber 46 will therefore likewise be vented permitting lever 38 to assume the position in which it is shown in the drawing. With the lever 38 thus positioned, diaphragm 16 will assume a position in which the release valve 28 is open, or just closed, with the compensating chamber 12 of the brake cylinder device 4 at substantially atmospheric pressure, it being noted that as long as any material pressure of fluid might be present in said chamber, the diaphragm 16 will be deflected by such pressure to open said release valve.

Now let it be assumed that the engineer of a train starts charging of the brake pipe 2 with fluid under pressure. As fluid under pressure is thus supplied to the brake pipe, it will flow to valve chamber 108 in the cut-off valve device 101 and thence through port 113 in the slide valve 111 to passage 99 for charging a volume reservoir 114 and check valve chamber 98 in the locking device 87. At the same time fluid under pressure will also flow from valve chamber 111 through port 114 to passage 65 and thence to diaphragm chamber 107 of the cut-off valve device 101, to diaphragm chamber 64 in the unloading valve device 49 and to diaphragm chamber 95 in the locking device 87.

When a certain pressure of fluid is thus obtained in passage 65 and thereby in chamber 64 of the unloading valve device 49, the diaphragm 63 will deflect to close valve 58 and open valve 50 for thereby venting the diaphragm chamber 46 to atmosphere past the latter valve and thence via passage 53, for reasons which will be later brought out. When the pressure in passage 65 is increased to a chosen higher degree, such pressure acting in chamber 95 on diaphragm 94 of the locking device 87 will deflect diaphragm 94 and actuate lever 90 to withdraw rod 88 from locking engagement with rod 69 whereupon spring 73 will shift the rod 69 downwardly until head 74 engages the piston 75. During this movement of rod 69, the lever 38 will fulcrum about its connection with nut 34 of the supply and release valve device 15 with diaphragm chamber 46 vented, the follower 41 collapsing the diaphragm 45.

After the rod 88 releases from rod 69, said rod 88 engages and unseats the check valve 97, whereupon the fluid under pressure already present in the volume reservoir 114 quickly equalizes into passage 77, one end of which is lapped by slide valve 111 in the cut-off valve device 101, and thereby becomes effective in the strut piston chamber 76. The pressure of fluid thus obtained in chamber 76 then moves the piston 75 and thereby the head 74 and rod 69 upwardly until the foot 79 engages the unsprung part 83 of the vehicle at which time movement of piston 75 will stop. The piston 75 and stem 74 will thus be stopped in a position corresponding to the load on the vehicle, for it will be seen that if the vehicle is empty and the vehicle sprung parts and thereby the brake controlling valve device 1 are in a maximum elevated position with respect to the unsprung part 83, the piston 75 and rod 69 will assume a lowermost position, while in case the vehicle is fully loaded and the body thereof in a lowermost position with respect to the unsprung part 83 of the vehicle, the foot 79 will permit maximum upward movement of piston 75 and rod 69. For any degree of load between empty and full load, the piston 75 and thereby rod 69 will be adjusted to a corresponding position. It will therefore be seen that the lever 38 and follower 41 will, during the operation just described, be adjusted relative to diaphragm 45 according to the load on the vehicle.

While the lever 38 and diaphragm follower 41 are being adjusted as above described, the pressure of fluid in brake pipe 2, valve chamber 108 and diaphragm chamber 107 of the cut-off valve device 101 will be gradually increasing. This increase in pressure in chamber 107 will gradually deflect diaphragm 102 against spring 104 increasing the pressure of said spring against diaphragm 103 to hold it and the slide valve 111 in the position in which they are shown in the drawing. This deflection of diaphragm 102 will finally be stopped by contact of a follower 114a with the casing whereupon further increase in pressure in brake pipe 2 and valve chamber 108 will deflect diaphragm 103 against spring 104 and move the slide valve 111 from the cut-in position in which it is shown in the drawing to a cut-off position defined by contact of a follower 115 with the casing.

In this cut-off position of slide valve 111 a cavity 116 therein will connect passage 65 to an exhaust port 117 whereupon fluid under pressure will be promptly vented from diaphragm chamber 107 in the cut-off valve device 101, chamber 64 in the unloading device 49 and chamber 95 in the locking device 87.

This venting of fluid under pressure from chamber 107 will permit expansion of spring 104 and reduction in pressure thereof on diaphragm 103 to a degree where brake pipe pressure in chamber 108 will hold the slide valve 111 in its cut-off position until subsequently reduced to a chosen low pressure, such as ten pounds, it being noted that due to the action of diaphragm 107 to compress spring 104, as above described, movement of the slide valve 111 to its cut-off position was prevented until brake pipe pressure was increased to a higher degree, such as fifty pounds.

The venting of fluid under pressure from diaphragm chamber 95 in the locking device 87 permits spring 96 to move rod 88 into locking engagement with rod 69, while the venting of fluid under pressure from chamber 64 in the unloading valve device 49 permits seating of valve 50 by spring 68 and unseating of valve 58 by spring 67, thereby reopening diaphragm chamber 46 to the brake cylinder passage 8. The parts of the locking device 87 are so designed as to lock rod 69 in an adjusted position prior to operation of the unloading device 89 to reopen chamber 46 to passage 8 so that if fluid under pressure should be present in passage 8 the rod 69 being locked, such pressure will not be able to move said rod, which otherwise might damage the teeth 89 thereon.

At the same time as passage 65 is vented via the cut-off slide valve 111, passages 77 and 79 will also be vented through said slide valve via cavity 118 therein and a restricted port 119 opening said cavity to the vented cavity 116. This venting of fluid under pressure from passage 77 results in release of fluid under pressure from the strut piston chamber 76 whereupon spring 84 will move the piston 75 down out of contact with head 74 which is now locked by rod 88, while foot 79 on the end of rod 78 will be moved out of contact with the unsprung portion 83 of the vehicle. The restricted port 119 so delays release of fluid under pressure from the strut piston chamber 76 with respect to the faster venting of fluid under pressure from diaphragm chamber 95 that the rod 88 will be positively moved into locking engagement with rod 69 to hold it in the position to which it has been adjusted by piston 75 before said piston is permitted to move.

With the follower 41 adjusted relative to daphragm 45 according to the loaded condition of the vehicle, as above described, if by operation of either the service application portion 5 or said portion and the emergency application portion 6 in response to a reduction in pressure in brake pipe 2, fluid under pressure is supplied to passage 8, such fluid will flow through pipe 9 to pressure chamber 10 of the brake cylinder device 4 to actuate piston 11 therein to apply the brakes on the vehicle. At the same time, a portion of the fluid supplied to passage 8 will flow therefrom past valve 58 in the unloading device 49 to diaphragm chamber 46 and therein act to press the diaphragm 45 against the follower 43. The pressure thus applied by diaphragm 45 to follower 41 depends upon the load adjusted position of said follower relative to said diaphragm. If the vehicle is fully loaded the area of contact of diaphragm 45 with surface 44 of follower 41 will be so slight as not to create sufficient force to move said follower and the lever 38. On the other hand, if the vehicle is empty or less than fully loaded the area of contact of diaphragm 45 with surface 44 of follower 41 will be such that sufficient pressure will be obtained on said follower to promptly turn the one end of lever 38 about the fulcrum pin 39 and operate its other end to deflect diaphragm 16 to move the seated release valve 27 and pin 120 to unseat the fluid pressure supply valve 24. Upon opening of supply valve 24 fluid under pressure from the load reservoir 3 will flow past said valve and through passage 25 in bushing 22 to diaphragm chamber 17 and thence through pipe 13 to the compensating chamber 12 in the brake cylinder device 4.

As fluid under pressure is thus supplied to the compensating chamber 12 in the brake cylinder device the pressure of such fluid in chamber 17 acts on diaphragm 16 in opposition to force of lever 38, and the pressure of such fluid will increase until it slightly overbalances the force of lever 38 controlled by the area of contact of diaphragm 45 with follower 41. When this condition is obtained, the diaphragm 16 will deflect against lever 38 to permit closing of the supply valve 24 for thereby limiting the pressure of fluid obtained in the brake cylinder compensating chamber 12 in accordance with the load adjusted position of follower 41 with respect to diaphragm 45.

The parts may be so designed that when the vehicle is empty, the follower 41 will be so adjusted relative to diaphragm 45 as to require substantially the same pressure in the brake cylinder compensating chamber 12 and diaphragm chamber 17, as present in passage 8, to deflect the diaphragm 16 against the opposing force from diaphragm 45 on the lever 38. If the car is fully loaded, insufficient pressure will be obtained on follower 41 from diaphragm 45 to actuate lever 38, while for any degree of load between full load and empty, the pressure obtained in the brake cylinder compensating chamber 12 and required in chamber 17 to deflect diaphragm 16 and permit seating of the supply valve 24 will be in proportion. Thus, by adjusting follower 41 relative to diaphragm 45 according to the loaded condition of the vehicle, upon charging the brake pipe 2, the pressure in the brake cylinder compensating chamber 12 will be varied inversely according to load in effecting an application of brakes.

It is to be noted that pressure of fluid in the brake cylinder compensating chamber 12 opposes that in chamber 10 to reduce the effectiveness of the latter to apply the brakes on a vehicle whereby with the pressure in chamber 12 varied inversely according to load, a maximum braking force will be applied to the vehicle when fully loaded and a minimum force when empty.

If the pressure in the brake pipe 2 is reduced by an over-reduction at a service rate and by an emergency reduction to a degree where spring 104 in the cut-off valve device 101 is enabled to move the slide valve 111 to its cut-in or right hand position, it will be noted that the brakes will be applied and that passage 65 will be opened to the vented brake pipe instead of to atmosphere through the passage 17. This will have no effect upon the brake controlling valve device in any way unless, with the brakes still applied, the brake pipe 2 is recharged with fluid under pressure.

It will be noted that with the brakes applied under the condition just set forth, if the brake pipe 2 is recharged with fluid under pressure, such fluid will become effective through the cut-off valve device 101 and passage 65 in diaphragm chamber 64 of the unloading device 49 and diaphragm chamber 95 of the locking device 87. The spring 67 in the unloading device 49 is such however as to permit deflection of diaphragm 62 to seat valve 58 and unseat valve 50 before the diaphragm 94 can deflect against spring 96. The opening of valve 50 in the unloading device 49 will therefore vent fluid under pressure from chamber 46 to relieve the lever 38 of actuating force before the rod 88 will be moved out of locking engagement with rod 69, in order to avoid stripping of the teeth 89 on said rods by said actuating force; the light bias force of spring 73 not being considered detrimental in this respect.

The venting of fluid under pressure from chamber 46 and thereby relieving the lever 38 of actuating force will of course permit brake cylinder pressure in compensating chamber 12 to deflect diaphragm 16 downwardly to unseat the release valve 28 whereupon said chamber will be vented via passage 35, chamber 20 and atmospheric passage 21, but this will have no effect upon the vehicle since it will be stopped.

With the cut-off valve device 101 in its cut-in position, in which it is shown in the drawing, the diaphragm follower 41 will again be adjusted relative to diaphragm 45 in accordance with the loaded condition of the vehicle as the pressure in brake pipe 2 is restored, in the same manner as above described. Further, fluid under pressure will be released from the brake cylinder pressure chamber 10 to effect release of the brake application on the vehicle by operation of the service application portion 5 upon sufficient restoration of pressure in brake pipe 2, in the usual manner.

Summary

It will now be seen that with the diaphragm 45 clamped around its edge in the casing and the provision of means for adjusting the follower 41 relative to said diaphragm according to the loaded condition of the car, the fluid pressure supply and release communication to chamber 46 may be in the casing of the device and not require a slip joint connection as in the structure disclosed in the aforementioned Cook application.

Having now described my invention, what I claim as new and desire to secure by Letters Patent, is:

1. In a fluid pressure brake apparatus, in combination, valve means operative by an actuating force opposing pressure of fluid to vary the pressure of said fluid in accordance with the degree of said actuating force, and means for providing said actuating force comprising a cup-like flexible diaphragm subject on its inner side to fluid under pressure, means connecting said diaphragm to said valve means comprising a follower disposed in coaxial relation with and engaging the opposite side of said diaphragm and adjustable axially relative to said diaphragm to vary the area of contact between said follower and diaphragm for correspondingly limiting the degree of said actuating force, and means for adjusting said follower relative to said valve means toward and away from said diaphragm.

2. In a fluid pressure brake apparatus, in combination, valve means operative by an actuating force opposing pressure of fluid to vary the pressure of said fluid in accordance with the degree of said actuating force, and means for providing said actuating force comprising a cup-like flexible diaphragm subject on its inner side to fluid under pressure, means connecting said diaphragm to said valve means comprising a follower disposed in coaxial relation with and engaging the opposite side of said diaphragm and adjustable axially relative to said diaphragm to vary the area of contact between said follower and diaphragm for correspondingly limiting the degree of said actuating force, unloading means for releasing fluid under pressure from said inner side of said diaphragm, adjusting means for adjusting said follower toward and away from said diaphragm, control means for effecting operation of said unloading means and adjusting means, and means, operative upon operation of said control means, to delay operation of said adjusting means until after operation of said unloading means.

3. In a fluid pressure brake apparatus, in combination, valve means operative by an actuating force opposing pressure of fluid to vary the pressure of said fluid in accordance with the degree of said actuating force, and means for providing said actuating force comprising a cup-like flexible diaphragm subject on its inner side to fluid under pressure, means connecting said diaphragm to said valve means comprising a follower disposed in coaxial relation with and having a parabolic like face engaging the opposite side of said diaphragm and adjustable axially relative to said diaphragm to vary the effective area of said diaphragm, unloading means for releasing fluid under pressure from said one side of said diaphragm, adjusting means for adjusting said follower toward and away from said diaphragm, means for locking said follower in an adjusted condition, and means for effecting operation of said unloading means, for releasing said locking means and for effecting operation of said adjusting means in the order named.

4. In a fluid pressure brake apparatus, a brake control valve device comprising in combination, a casing, a fluid pressure passageway in said casing, valve means in said casing operative by an actuating force to supply fluid under pressure to and release fluid under pressure from said passageway for varying the pressure therein in accordance with the degree of said actuating force, and means for providing said actuating force comprising a cup-like flexible diaphragm clamped around its edge to said casing and adapted to be subjected on its inner face to pressure of fluid, a follower element slidably mounted in said casing in coaxial relation to and engaging the opposite face of said diaphragm, adjustable means connecting said follower element to said valve means for transmitting said actuating force to said valve means and operative to move said follower element axially relative to said diaphragm to thereby vary the degree of contact between said diaphragm and follower element and in turn the degree of said actuating force, and means for adjusting said adjustable means.

5. In a fluid pressure brake apparatus, a brake control valve device comprising in combination, a casing, a fluid pressure passageway in said casing, valve means in said casing operative by an actuating force to supply fluid under pressure to and release fluid under pressure from said passageway for varying the pressure therein in accordance with the degree of said actuating force, and means for providing said actuating force comprising a cup-like flexible diaphragm clamped around its edge to said casing and adapted to be subjected on its inner face to pressure of fluid, a follower element slidably mounted in said casing in coaxial relation to and engaging the opposite face of said diaphragm, a lever, means connecting said valve means and follower means to spaced apart portions of said lever for transmitting actuating force from said follower means to said valve means, fulcrum means for said lever connected to another portion thereof, and means for adjusting said fulcrum means to move said follower element relative to said diaphragm to thereby vary the area of contact between said follower element and diaphragm.

6. In a fluid pressure brake apparatus, in combination, a brake control valve device comprising a casing, a fluid pressure passageway in said casing, valve means in said casing controlled by an actuating force for varying pressure of fluid in said passageway in accordance with the degree of said actuating force, and means for providing said actuating force comprising a cup-like flexible diaphragm clamped around its edge in said casing and adapted to be subjected on its inner side to pressure of fluid, a follower element slidably mounted in said casing in coaxial relation to said diaphragm for varying the effective area of said diaphragm and engaging the opposite side of said diaphragm, means connecting said follower element to said valve means for transmitting actuating force from said diaphragm to said valve means, adjusting means controlled by load on a vehicle operative to move said follower element axially either toward or away from said diaphragm in accordance with the degree of said load, locking means for holding said adjusting means in an adjusted position, a brake pipe, and means operative in response to charging of said brake pipe with fluid up to a chosen pressure to release said locking means and effect operation of said adjusting means and operative in response to fluid in said brake pipe at a greater pressure to render said locking means effective.

7. In a fluid pressure brake apparatus, in combination, a brake control valve device comprising a casing, a fluid pressure passageway in said casing, valve means in said casing controlled by an actuating force for varying pressure of fluid in said passageway in accordance with the degree of said actuating force, and means for providing said actuating force comprising a cup-like flexible diaphragm clamped around its edge in said casing and adapted to be subjected on its inner side to pressure of fluid, a follower element slidably mounted in said casing in coaxial relation to said diaphragm for varying the effective area of said diaphragm and engaging the opposite side of said diaphragm, means connecting said follower element to said valve means for transmitting actuating force from said diaphragm to said valve means, adjusting means controlled by load on a vehicle operative for moving said follower element axially either toward or away from said diaphragm to vary the area of contact therebetween in accordance with said load, locking means for holding said adjusting means in an adjusted position, a second passageway for conveying fluid under pressure to and from said inner side of said diaphragm, unloading means controlling communication through said second passageway and operative to either open said communication or to close said communication and release fluid under pressure from said inner side of said diaphragm, a brake pipe, and means responsive to pressure of fluid in said brake pipe operative upon charging thereof up to a chosen pressure to effect operation of said unloading means to release fluid under pressure on said diaphragm, to release said locking means and effect operation of said adjusting means in the order named and operative in response to a higher pressure in said brake pipe to render said locking means effective and then effect operation of said unloading means to open said communication.

8. In a fluid pressure brake apparatus, in combination, a brake pipe, a first passageway, valve means operative upon a reduction in brake pipe pressure to supply fluid under pressure to said passageway and upon an increase in brake pipe pressure to vent said passageway, a brake control passageway, valve means arranged for control by an actuating force for varying pressure of fluid in said brake control passageway according to the degree of said actuating force, and means for providing said actuating force comprising a cup-like flexible diaphragm adapted to be subjected on its inner face to pressure of fluid from said first passageway, an axially adjustable follower element arranged in coaxial relation to and engaging the opposite face of said diaphragm, means for transmitting actuating force applied by said diaphragm to said follower element from said follower element to said valve means to control operation thereof, and means for adjusting said follower element axially relative to said diaphragm to vary the area of contact therebetween to thereby vary the degree of actuating force applied to said valve means for any chosen pressure of fluid in said first passageway acting on said diaphragm.

9. In a fluid pressure brake apparatus, in combination, a brake pipe, a first passageway, valve means operative upon a reduction in brake pipe pressure to supply fluid under pressure to said passageway and upon an increase in brake pipe pressure to vent said passageway, a brake control passageway, valve means arranged for control by an actuating force for varying pressure of fluid in said brake control passageway according to the degree of said actuating force, and means for providing said actuating force comprising a cup-like flexible diaphragm adapted to be subjected on its inner face to pressure of fluid from said first passageway, an axially movable follower element engaging the opposite face of said diaphragm, means arranged in coaxial relation to and adjustable relative to said diaphragm for transmitting actuating force applied by said diaphragm to said follower element from said follower element to said valve means to control operation thereof, adjusting means operative by fluid under pressure to adjust said follower element relative to said diaphragm to vary the area of contact therebetween in accordance with the load on a vehicle and thereby to correspondingly vary the degree of force transmitted from said diaphragm to said follower element, fluid pressure controlled locking means operative upon release of fluid under pressure to lock said adjusting means in an adjusted position and operative by fluid under pressure to first release said adjusting means for adjustment and to then supply fluid under pressure to said adjusting means, and means controlled by pressure of fluid in said brake pipe operative with such pressure below a chosen degree to subject said locking means to pressure of fluid in said brake pipe and when above said chosen degree to establish communication for venting fluid under pressure from both said locking means and adjusting means, and a choke in the vent communication from said adjusting means.

10. In a fluid pressure brake apparatus, in combination a brake pipe, a first passageway, valve means operative upon a reduction in brake pipe pressure to supply fluid under pressure to said passageway and upon an increase in brake pipe pressure to vent said passageway, a brake control passageway, valve means arranged for control by an actuating force for varying pressure of fluid in said brake control passageway according to the degree of said actuating force, and means for providing said actuating force comprising a cup-like flexible diaphragm adapted to be subjected on its inner face to pressure of fluid from said first passageway, a follower element engaging the opposite face of said diaphragm in coaxial relation therewith and adjustable axially relative to said diaphragm, means for transmitting actuating force applied by said diaphragm to said follower element from said follower element to said valve means to control operation thereof, adjusting means operative by fluid under pressure to adjust said follower element relative to said diaphragm for varying the area of contact therebetween according to the load on a vehicle to thereby correspondingly limit the force applied to said follower element by pressure of fluid acting on said diaphragm, locking means operative by fluid at a chosen pressure to release said adjusting means for operation and to then supply fluid under pressure to said adjusting means for effecting operation thereof and operative upon release of fluid under pressure to lock said adjusting means in an adjusted condition, unloading means controlling communication through said first passageway to said flexible diaphragm and operative by fluid at a pressure lower than said chosen pressure to close said communication and vent fluid under pressure from said diaphragm and operative upon release of fluid under pressure to open said communication, and valve means controlled by pressure of fluid in said brake pipe operative with brake pipe pressure below a chosen degree to subject said locking means and unloading means to pressure of fluid in said brake pipe and when above such chosen degree of pressure to release fluid under pressure from said locking means and unloading means at one rate and from said adjusting means at a slower rate.

11. In a fluid pressure brake apparatus, in combination, a brake pipe, a first passageway, valve means operative upon a reduction in brake pipe pressure to supply fluid under pressure to said passageway and upon an increase in brake pipe pressure to vent said passageway, a brake control passageway, valve means arranged for control by an actuating force for varying pressure of fluid in said brake control passageway according to the degree of said actuating force, and means for providing said actuating force comprising a cup-like flexible diaphragm adapted to be subjected on one face to pressure of fluid from said first passageway, a follower element engaging the opposite face of said diaphragm in coaxial relation therewith and adjustable axially relative to said diaphragm, a lever, means connecting spaced apart portions of said lever to said valve means and follower element for transmitting actuating force between said diaphragm and valve means, a fulcrum for said lever, a piston operative by fluid under pressure and cooperative with an unsprung part of a vehicle to adjust said fulcrum according to the load on a vehicle to thereby correspondingly vary the area of contact between said diaphragm and follower element for in turn limiting the degree of force applied to said follower element by said diaphragm, locking means for locking said fulcrum in a load adjusted position and operative by fluid under pressure to release said fulcrum for adjustment, means operative by said locking means subsequent to release of said fulcrum to supply fluid under pressure to said piston, and means controlled by pressure of fluid in said brake pipe operative with such pressure below a chosen degree to subject said locking means to brake pipe pressure and operative upon an increase in brake pipe pressure to above said chosen degree to vent fluid under pressure from said locking means at one rate and from said piston at a slower rate.

References Cited in the file of this patent

UNITED STATES PATENTS

| | | |
|---|---|---|
| 2,450,464 | Bent | Oct. 5, 1948 |
| 2,458,965 | Sudduth | Jan. 11, 1949 |
| 2,482,246 | Cook et al. | Sept. 20, 1949 |

FOREIGN PATENTS

| | | |
|---|---|---|
| 639,201 | Germany | Nov. 12, 1936 |